(12) United States Patent
Kumagai

(10) Patent No.: US 7,675,553 B2
(45) Date of Patent: Mar. 9, 2010

(54) IMAGE TRANSFER APPARATUS, CONTROL METHOD, PROGRAM, AND STORAGE MEDIUM

(75) Inventor: Atsushi Kumagai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 11/189,500

(22) Filed: Jul. 26, 2005

(65) Prior Publication Data

US 2006/0024043 A1 Feb. 2, 2006

(30) Foreign Application Priority Data

Jul. 28, 2004 (JP) ............................. 2004-220386

(51) Int. Cl.
*H04N 5/76* (2006.01)
*H04N 5/225* (2006.01)
*G06F 17/00* (2006.01)

(52) U.S. Cl. ............................... 348/231.2; 348/231.99; 348/207.1; 707/104.1

(58) Field of Classification Search ... 348/231.1–231.9, 348/231.99, 207.1, 211.1–211.6; 382/116, 382/306; 396/322; 707/104.1
See application file for complete search history.

(56) References Cited

U.S. PATENT DOCUMENTS

| | | | | |
|---|---|---|---|---|
| 5,633,678 A * | 5/1997 | Parulski et al. | ........... | 348/231.5 |
| 5,796,428 A * | 8/1998 | Matsumoto et al. | .... | 348/207.99 |
| 5,806,072 A * | 9/1998 | Kuba et al. | ................. | 707/200 |
| 7,193,646 B1 * | 3/2007 | Shioji | ...................... | 348/220.1 |
| 7,248,290 B2 * | 7/2007 | Shioji | ...................... | 348/231.2 |
| 2002/0093582 A1 * | 7/2002 | Aoki et al. | ............ | 348/333.02 |
| 2002/0181939 A1 * | 12/2002 | Date et al. | .................... | 386/95 |
| 2003/0048364 A1 * | 3/2003 | Ohmura | ................... | 348/231.6 |
| 2003/0161617 A1 * | 8/2003 | Um et al. | .................... | 386/121 |
| 2003/0236797 A1 * | 12/2003 | Nita | .......................... | 707/200 |
| 2004/0109062 A1 * | 6/2004 | Yamaya | .................. | 348/207.1 |

FOREIGN PATENT DOCUMENTS

JP        2005-151399        6/2005

* cited by examiner

*Primary Examiner*—Tuan Ho
*Assistant Examiner*—Marly Camargo
(74) *Attorney, Agent, or Firm*—Canon USA Inc IP Div

(57) ABSTRACT

An image transfer apparatus for transferring image data files to an external device appends a common file attribute to a plurality of image data files having predetermined attributes when the image data files stored on a recording medium are transferred.

4 Claims, 7 Drawing Sheets

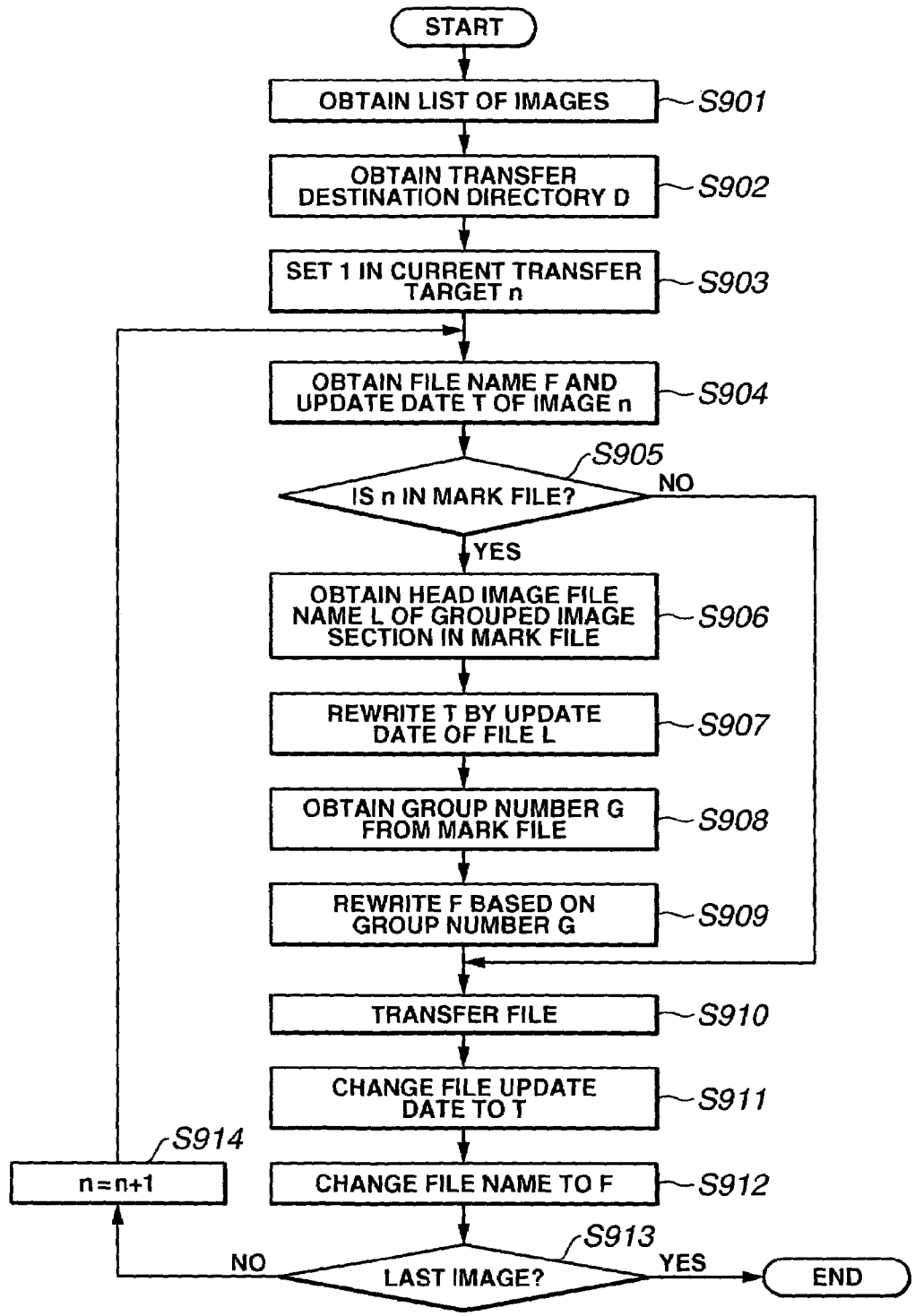

IMAGE TRANSFER APPARATUS, CONTROL METHOD, PROGRAM, AND STORAGE MEDIUM

BACKGROUND OF THE INVENTION

1. Field of the Invention

The present invention relates to an image transfer apparatus for transferring image data to the outside, a method of controlling the same, a program having a module to enable a computer to execute a predetermined control method, and a storage medium for storing the program.

2. Description of the Related Art

There has been conventionally a system capable of grouping and treating a plurality of image data as a set of "grouped images" in the case when one target is recorded to create a plurality of image data. In this system, for example, when one object is photographed several times by a camera, or when one object is photographed a plurality of times while changing photographic parameters such as image quality, such a plurality of image data can be treated as a set.

To realize the system, an image creation apparatus must be provided with means to specify whether or not a certain image is a grouped image. This image creation apparatus makes a record as an attribute in a part of image data concerning whether or not the image is a grouped image, according to a user's specification at the time of creating the image or after creating the image. In connection with this, there is an image creation apparatus which can identify a set of grouped images without mixing it with other sets of grouped images by a method of recording an identifier unique to each set of grouped images.

There is a digital camera which includes a "panorama photography mode." According to this product, panorama photography information is recorded in an image which a user photographs by setting the camera to the "panorama photography mode," thereby discriminating it from other images.

Further, a method may be employed by which the image creation apparatus records each set of grouped images in a respective directory. If image data created by this method is directly displayed including a directory structure, the grouped images are classified and displayed in respective folders. Accordingly, the user can instantly determine which image is included in the set of grouped images without checking contents of the image data. In other words, it is not necessary to analyze attributes of the grouped images in an image processing apparatus. Thus, an image processing apparatus which conforms to grouped images created by a plurality of image creation apparatus can be realized by a simple configuration.

However, the aforementioned methods of using a file name, to which a character string common among the grouped images is added, or creating another directory may not be realized or satisfactory effects can not be obtained in some image creation apparatus because of limitations of the file name or the directory structure.

For example, in the digital camera, a standard, Design rule for Camera File system (DCF), imposes limits on the directory structure and the number thereof. This standard attaches importance to compatibility in using a removable or exchangeable recording medium for various kinds of devices.

According to this standard, a directory name is used as a part of serial numbers indicating a photographing order of images. Thus, it is impossible to record images separating the grouped images in another folder and storing the other images in a normal folder all together. Besides, in the case of storing the grouped images separately in another folder, normal images must be recorded in a new folder each time grouped images are photographed, and as its result many folders are created.

In such method, satisfactory effects in recording the grouped images separately in another folder cannot be obtained. Accordingly, in the image creation apparatus, writing attributes of the grouped images in a specific area called a header in image data or describing grouped image information in a file different from an image file is used in place of creating a directory for each set of grouped images.

However, when such a method is used, the image processing apparatus must have means for analyzing grouped image information in the header or in another file of image data written by the image creation apparatus in order to treat the grouped images as intended by a user in the image processing apparatus.

Furthermore, there is a possibility that an information recording order of the grouped images will vary from one image creation apparatus to another. Accordingly, there is a problem that a complex configuration is required in order to implement an image processing apparatus which can deal with grouped images created by a plurality of image creation apparatus.

SUMMARY OF THE INVENTION

The present invention is directed to an image transfer apparatus and a control method thereof. According to one aspect of the present invention, an image transfer apparatus for transferring image data files to an external device includes a recording medium configured to store the image data files, and an attribute appending unit configured to append a common file attribute to a plurality of image data files having predetermined attributes.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a flowchart showing a processing flow of an image transfer apparatus according to the second embodiment.

DETAILED DESCRIPTION OF THE EMBODIMENTS

First Embodiment

Figure 1:
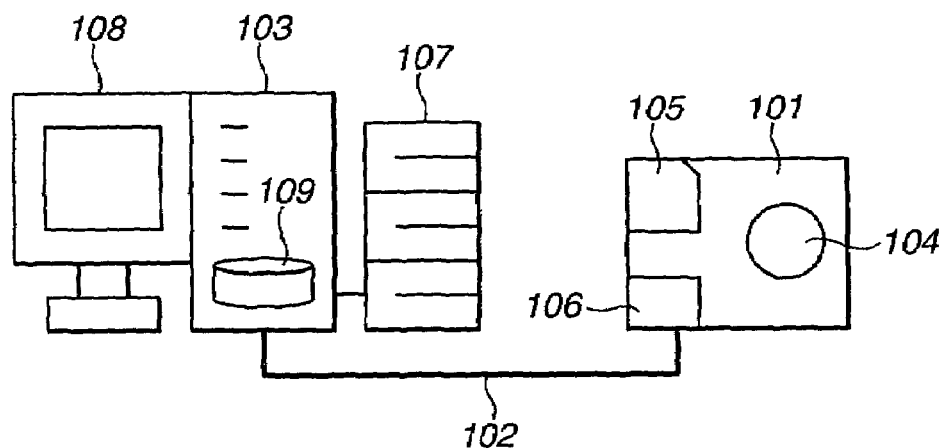
FIG. 1 is a diagram showing a configuration of a grouped image transfer apparatus according to a first embodiment of the present invention.

FIG. 1 is a diagram showing a configuration of an image transfer system according to a first embodiment of the present invention.

A digital camera 101 and a computer apparatus 103 are connected to each other through a cable 102. The digital camera 101 that functions as an image creation apparatus includes a photography apparatus 104, a memory card 105, and an image transfer apparatus 106 for transferring image data. A disk apparatus 107 and a display apparatus 108 are connected to the computer apparatus 103, which functions as an image processing apparatus. Image display software 109 is operated on the computer apparatus 103, and an image file recorded in the disk apparatus 107 is displayed on the display apparatus 108.

Figure 2:
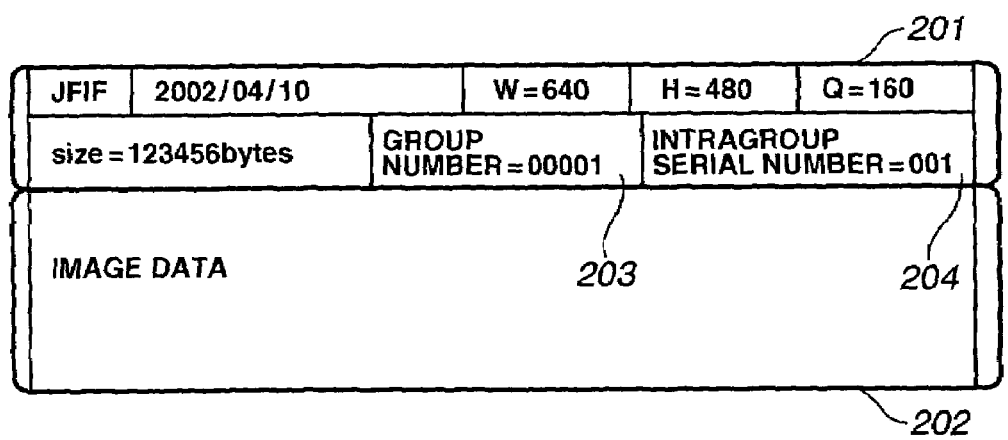
FIG. 2 is a diagram showing an example of data of an image file according to the first embodiment.

FIG. 2 is a diagram showing an example of a data structure of the image file recorded by the digital camera 101.

Data of the image file includes a header part 201 and an image data part 202. In the header part 201, a group number 203 and an intragroup serial number 204 are recorded as grouped image information. The intragroup serial number 204 is a unique number in grouped images having similar group numbers.

In the digital camera 101 of the first embodiment, a user must set operation in a grouped image photography mode before photographing images. In each of the images photographed in the grouped image photography mode, the aforementioned information is automatically written in the header part 201.

The grouped images taken according to the first embodiment are those photographed by panorama photography, continuous photography, interval photography, auto-bracketing photography, and the like. Hereinafter, these images will be described as grouped images.

Figure 3:
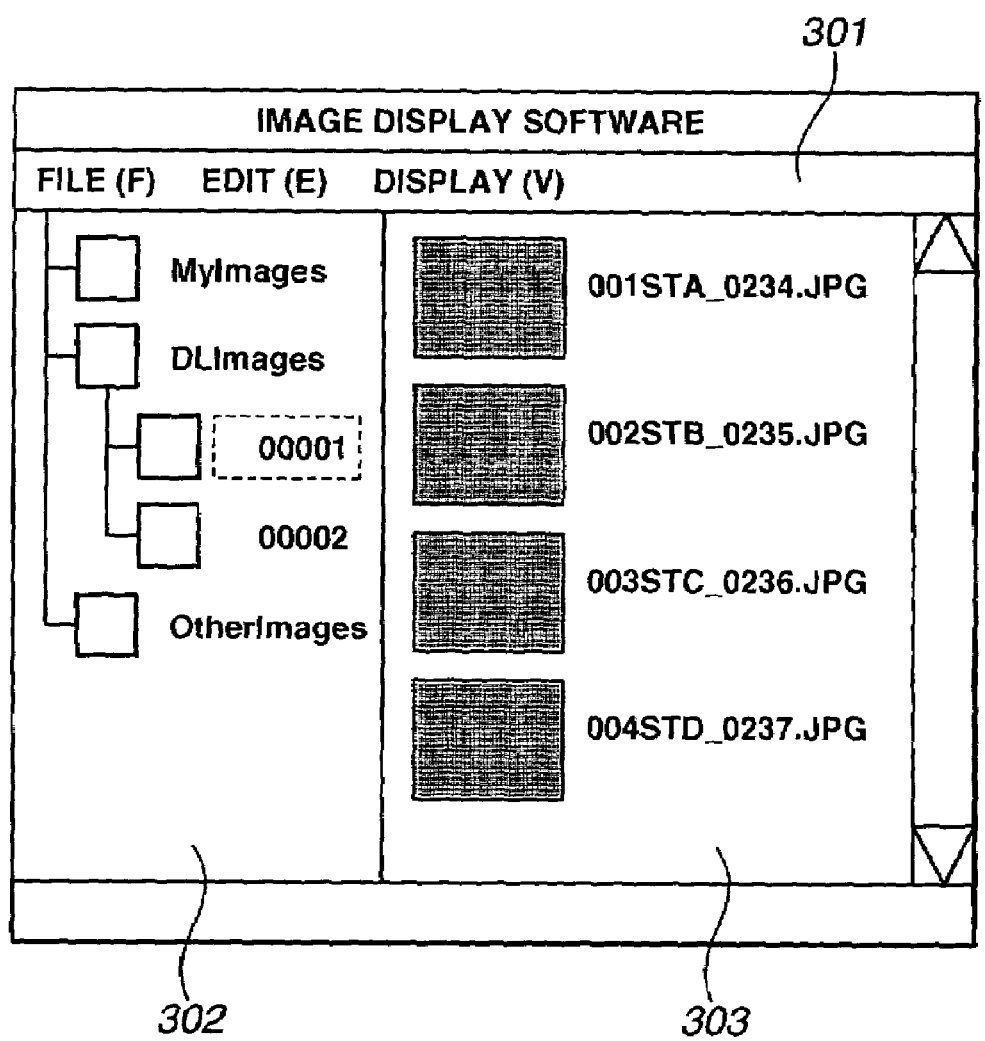
FIG. 3 is a diagram showing an example of a screen of image display software displayed on a display apparatus according to the first embodiment.

FIG. 3 shows a display example in which the image display software 109 is displayed on the display apparatus 108.

The screen includes a menu 301, a directory area 302, and a thumbnail area 303. In the directory area 302, directories within the disk apparatus 107 are displayed in a hierarchical manner.

When one of the directories displayed in the directory area 302 is selected, a list of thumbnail images of reduced image files present within the directory of the disk apparatus 107 is displayed in the thumbnail area 303. In FIG. 3, a directory 0001 is selected.

In the image display software 109, grouped image information written in the header part of each of the image files present within the disk apparatus 107 is not analyzed, but the files present in the disk apparatus 107 are organized by using file names and directory names, and displayed.

For a file system installed in the computer apparatus 103, for example, a general-purpose file system provided by an existing operation system can be used.

Figure 4:
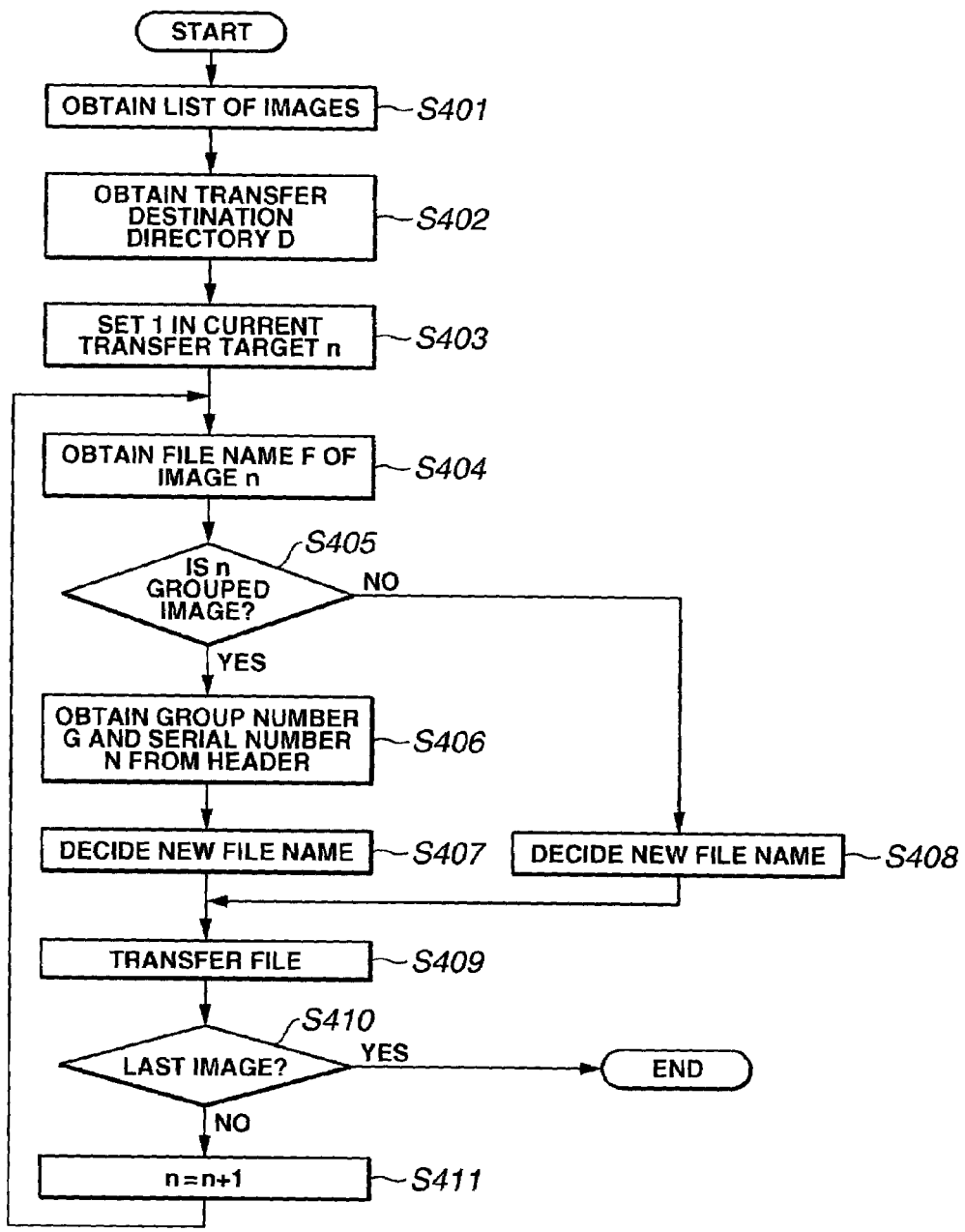
FIG. 4 is a flowchart showing a processing flow of an image transfer apparatus according to the first embodiment.

FIG. 4 is a flowchart showing a processing flow when the image transfer apparatus 106 transfers an image file recorded in the memory card 105 to the disk apparatus 107.

Contents of the flowchart are stored as program codes in an optional storage medium (not shown) in the digital camera 101, and read and executed by a CPU or the like of the digital camera 101.

First, in a step S401, the image transfer apparatus 106 obtains a list of all images to be transferred which have been recorded in the memory card 105. In the image list, at least file names of the images and serial numbers corresponding to the image file names are described. The process ends when there is no image to be transferred.

Next, in a step S402, the image transfer apparatus 106 decides a directory name D in the disk apparatus 107 for storing the images after their transfer. This directory name is decided based on setting made by user, a date, and the like. For example, the directory name D is DLImages.

Subsequently, in step S403, the image transfer apparatus 106 designates a first image as a current transfer target, i.e., an image whose serial number n is "1" in the image list.

The image transfer apparatus 106 obtains a file name F of the image of the current transfer target from the memory card 105 in step S404, and checks whether or not the image of the current transfer target has been photographed as a grouped image in step S405. If the image is a grouped image, the process proceeds to step S406. If the image is not a grouped image, the process proceeds to step S408. In the case of the image of the serial number "1," for example, a file name F is set to STA__0234.JPG.

In step S406, the image transfer apparatus 106 obtains the group number 203 and the intragroup serial number 204 from the header part 201 of the image file of the current transfer target, and stores them as G and N respectively. In the case of the image of the serial number "1," a shown in FIG. 2, the group number G is 00001, and the intragroup serial number N is 001.

In a subsequent step 407, the image transfer apparatus 106 decides a file name at a transfer destination when the grouped image is transferred. A file name including a directory in the disk apparatus 107 of the transfer destination is decided to be D¥G¥NF based on the G (group number 203) and the N (intragroup serial number 204), the image storing directory name D, and the file name F of the image in the memory card 105.

Here, "¥" is a delimiter indicating a directory. In the case of the image of the serial number 1, the file name D¥G¥NF including the directory is DLImages¥00001¥001STA__0234.JPG.

Similarly, in step S408, when an image other than the grouped image is transferred, the image transfer apparatus 106 decides that a file name including a directory is D¥F in the disk apparatus 107 of the transfer destination.

After the file name is decided in the disk apparatus 107 of the transfer destination through the aforementioned procedure, in step S409, the image transfer apparatus 106 transfers the image stored in the memory card 105 to the disk apparatus 107 with the decided name.

After the transfer processing ends, in step S410, the image transfer apparatus 106 checks whether or not the image of the current transfer target is a last image of transfer targets recorded in the memory card 105. If transfer of the last image has been finished, the image transfer apparatus 106 ends the processing. If the last image is not yet transferred, a next image is specified as a current transfer target in a step S411, then the process returns to step S404.

The image transfer apparatus 106 transfers the images according to the aforementioned procedure, so that the grouped image information recorded in the header part 201 of the image file stored in the memory card 105 can be correlated to the directory name or the file name in the disk apparatus 107. Accordingly, the image display software 109 can provide the grouped images in a classified state to the user without analyzing the grouped image information recorded in the header part 201 of the image file. This is shown in the display example of FIG. 3.

Second Embodiment

Figure 5:
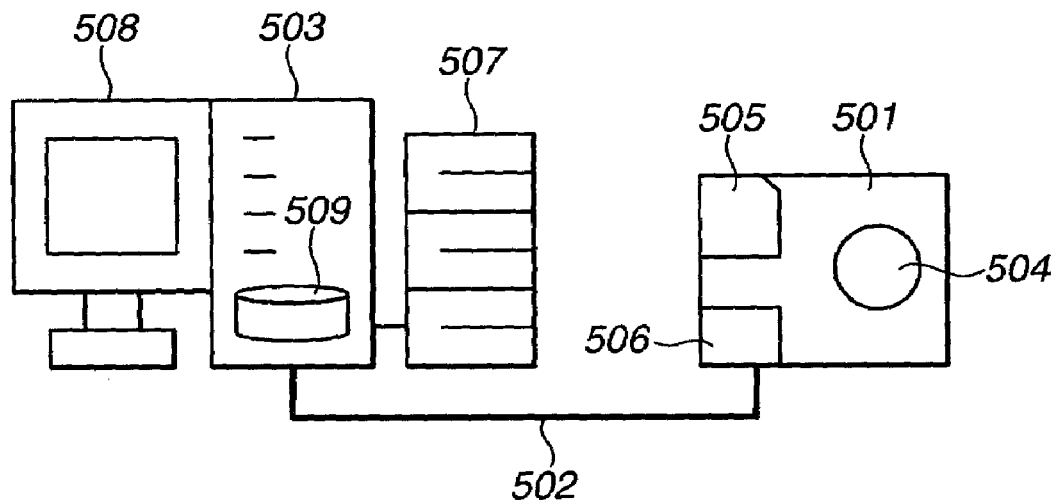
FIG. 5 is a diagram showing a configuration of a grouped image transfer system according to a second embodiment of the present invention.

FIG. 5 is a diagram showing a configuration of an image transfer system according to a second embodiment of the present invention.

A digital camera 501 and a computer apparatus 503 are connected to each other through a cable 502.

The digital camera 501 that functions as an image creation apparatus includes a photography apparatus 504, a built-in flash memory 505, and an image transfer apparatus 506 for transferring image data.

A disk apparatus 507 and a display apparatus 508 are connected to the computer apparatus 503, which functions as an image processing apparatus.

Image display software 509 is operated on the computer apparatus 503, and an image file recorded in the disk apparatus 507 is displayed on the display apparatus 508.

Figure 6:
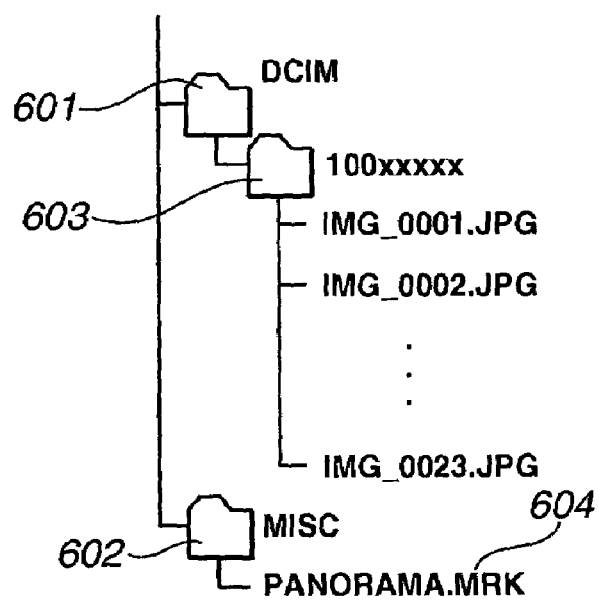
FIG. 6 is a diagram showing an example of a file structure in a built-in flash memory according to the second embodiment.

FIG. 6 is a diagram showing an example of a file structure in the built-in flash memory 505 of the second embodiment.

In the flash memory 505, there are a DCIM directory 601 and a MISC directory 602, and there is a 100 CANON directory 603 as a subdirectory in the DCIM directory 601.

In the 100 CANON directory 603, an image photographed by the photography apparatus 504 is stored in a JPEG file form.

A mark file 604 having grouped information recorded therein is present in the MISC directory 602.

Figure 7:
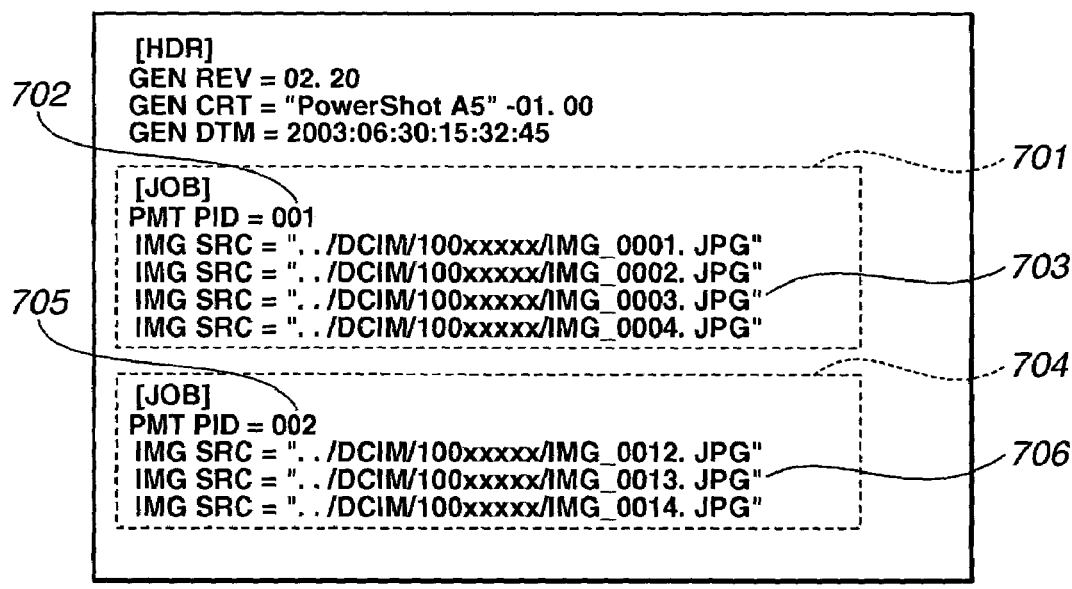
FIG. 7 is a diagram showing a description example of a mark file according to the second embodiment.

FIG. 7 shows an example of contents of the mark file 604.

In the mark file, one grouped image section 701 is present for each set of images, and a plurality of grouped image sections are present if there are plural sets of grouped images. At the top of the grouped image section, a group number 702 is described. Subsequently, file names 703 including directories of images belonging to the sets are described, images being arranged one by one.

According to the digital camera 501 of the second embodiment, after photographing images, a user can select a plurality of images present in the built-in flash memory 505, and designate the selected images as a new set of grouped images. By this operation, a grouped section is added to the mark file 604, and a designated image file name is described therein. In the grouped image section 704 thus added, a group number 705 is described, and file names 706 including directories of images belonging to the set are described, the images being arranged one by one.

Figure 8:
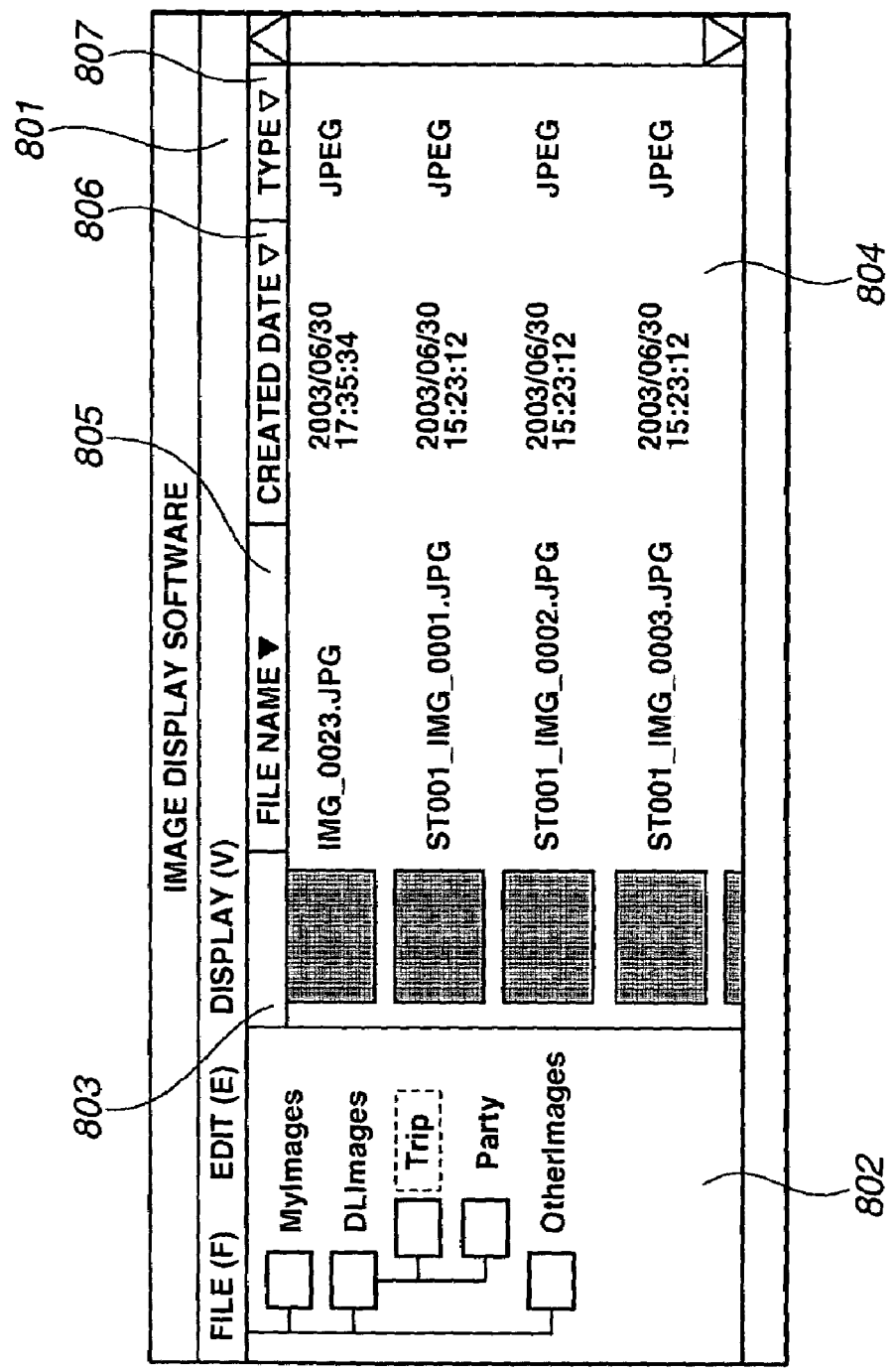
FIG. 8 is a diagram showing an example of a screen of image display software displayed on a display apparatus according to the second embodiment.

FIG. 8 shows a display example of a screen in which the image display software 509 is displayed on the display apparatus 508.

The screen includes a menu 801, a directory area 802, a sort button 803, and a thumbnail area 804. In the directory area 802, directories in the disk apparatus 507 are displayed in a hierarchical manner.

When one of the directories displayed in the directory area 802 is selected, a list of thumbnail images of reduced image files present within the directory of the disk apparatus 507 is displayed in the thumbnail area 804. In FIG. 8, a directory Trip is selected.

A plurality of sort buttons are arranged in the sort area 803. By clicking the sort buttons 805 in order of file names, image files displayed in the thumbnail area 804 are sorted and displayed in ascending order of the file names. By clicking the sort buttons 805 in order of the file names again, the image files displayed in the thumbnail area 804 are sorted and displayed in a descending order.

Similarly, there are a date order sort button 806 and a type sort button 807 which can respectively sort thumbnails of the thumbnail area 804 in order of thumbnail updates or in order of types of image file forms.

In the image display software 509, grouped image information written in the header part of each of the image files present in the disk apparatus 507 is not analyzed, but the files present in the disk apparatus 507 are organized and displayed using attributes of file names, directory names and the like.

FIG. 9 is a flowchart showing a processing flow when the image transfer apparatus 506 transfers an image file recorded on the memory card 505 to the disk apparatus 507.

Contents of the flowchart are stored as program codes in an optional storage medium (not shown) in the digital camera 501, and read and executed by a CPU or the like of the digital camera 501.

First, in step S901, the image transfer apparatus 506 obtains a list of all images recorded in the built-in flash memory 505 to be transferred. In the image list, at least file names of the images and serial numbers corresponding to the image file names are described. The process ends when there is no image to be transferred.

Next, in step S902, the image transfer apparatus 506 decides on a directory name D in the disk apparatus 507 for storing the images after their transfer. This directory name is decided based on settings made by the user, a date, and the like. For example, the directory name D is Trip.

Subsequently, in step S903, the image transfer apparatus 506 designates a first image as a current transfer target, i.e., an image whose serial number n is "1" in the image list.

The image transfer apparatus 506 obtains a file name F and a file update T of the image of the current transfer target from the memory card 505 in step S904, and checks whether or not the file name F is included in the mark file 604 in step S905.

If in step S905 it is determined that the file name F is included in the mark file 604, the image transfer apparatus 506 obtains, in step S906, a file name L recorded in a head of a grouped image section which includes the file name F of the mark file 604. Subsequently, in step S907, the image transfer apparatus 506 obtains an update of the file L, and replaces a value of the update T obtained in step S904 with this value. Then, in step S908, the image transfer apparatus 506 obtains a group number G of the grouped image section including the file F from the mark file 604. Subsequently, in step S909, the image transfer apparatus 506 adds a character string "ST" and group number to the head of the file name F obtained in step S904, rewrites the file name F in a form of <group number>_F, and then proceeds to step S910.

If it is determined in step S905 that the file name F is not included in the mark file 604, the image transfer apparatus 506 directly proceeds to step S910.

The image transfer apparatus 506 transfers a file from the built-in flash memory 505 to the disk apparatus 507 in step S910, then changes an update of the file transferred to the disk apparatus 507 to T in step S911. In step S912, the image transfer apparatus 506 changes the transferred file name to F. If an image regarding a serial number "1" is a file name IMG_0001.JPG, a group number 001 within the built-in flash memory 505, the transferred file name is set to ST001_IMG_0001.JPG.

Subsequently, in step S913, the image transfer apparatus 506 checks whether or not the image of the current transfer target is a last image of transfer targets recorded in the built-in flash memory 505. If transfer of the last image has been finished, the image transfer apparatus 506 ends the processing. If the last image is not yet transferred, in step S914, a next image is specified as a current transfer target, and then the process returns to step S904.

The image transfer apparatus 506 transfers the images according to the aforementioned procedure, so that the grouped image information recorded in the mark file 604 stored in the built-in flash memory 505 can be correlated to the file name and the file update in the disk apparatus 507. The image display software 509 sorts files in order of file names or file updates, so that grouped images are always displayed in continuous positions. This is shown in the display example of FIG. 8.

In other words, the image display software 509 can provide the grouped images in a classified state to the user without analyzing the grouped image information recorded in the mark file 604.

According to the second embodiment, the grouped image information recorded in the mark file 604 is correlated to the file name and the file update in the disk apparatus 507. However, similar effects can be obtained only by adopting either the file name or the file update.

As described above, the present invention can be also achieved by providing a storage medium, which stores program codes of the software for realizing the functions of the embodiments, to the system or the apparatus, and causing a computer (CPU or MPU) of the system or the device to read and execute the program codes stored in the storage medium. In this case, the program codes read from the storage medium realize themselves the aforementioned functions of the embodiments, and the storage medium storing the program codes constitutes the present invention. As such storage medium for supplying program codes, for example, a floppy disk (registered trademark), a hard disk, an optical disk, a magneto-optical disk, a CD-ROM, a CD-R, a magnetic tape, a nonvolatile memory card, or a ROM can be used.

Further, the functions of the embodiment are realized not only by the execution of the program codes read by the computer, but also realized by an operating system (OS) or the like which is operated on the computer and executes real processing in part or in whole based on instructions of the program codes. This aspect is also within the invention.

Furthermore, the program codes read from the storage medium can be written in a memory installed in a function expansion board inserted into the computer or a function expansion unit connected to the computer. Based on instructions of such program codes, a CPU or the like provided in the function expansion board or the function expansion unit executes real processing in part or in whole, thereby realizing the aforementioned functions of the embodiments, which is also within the invention.

While the present invention has been described with reference to exemplary embodiments, it is to be understood that the invention is not limited to the disclosed embodiments. The scope of the following claims is to be accorded the broadest interpretation so as to encompass all modifications and equivalent structures and functions.

This application claims priority from Japanese Patent Application No. 2004-220386 filed Jul. 28, 2004, which is hereby incorporated by reference herein in its entirety.

What is claimed is:

1. An image transfer system for transferring a plurality of image files recorded on a recording medium of an image creation apparatus and having file names which are based on a photographing order, to an image processing apparatus, the system comprising:

a recording control unit configured to control recording of an image file such that a plurality of image files obtained by photographing an object a plurality of times continuously using a group image photography mode by the image creation apparatus, are recorded in correlation to group information indicating one group to which the image files belong;

a changing unit configured to change the file names when sending the image file from the recording medium to the image processing apparatus, the files names being changed from the file names based on the photographing order to the file names based on the group information;

a determining unit configured to determine a directory where the image file is to be stored, of the image processing apparatus based on the group information;

a storing unit configured to store the image files in a storing region of the image processing apparatus according to the changed file names; and a displaying unit configured to display the image files in a condition classified according to the changed file names, wherein the group information includes a group number and an intragroup serial number, and the determining unit determines the directory based on the group number and the intragroup serial number.

2. An image transfer system according to claim 1, wherein the recording control unit controls writing the group information on a header of the image file.

3. A method for transferring a plurality of image files recorded on a recording medium of an image creation apparatus and having file names which are based on a photographing order, to an image processing apparatus, the method comprising:

controlling recording of an image file such that a plurality of image files obtained by photographing an object a plurality of times continuously using a grouped image photography mode by the image creation apparatus, are recorded in correlation to grouped information indicating one group to which the image files belong;

changing the file names when sending the image file from the recording medium to the image processing apparatus, the files names being changed from the file names based on the photographing order to the file names based on the group information determining a directory where the image file is to be stored, of the image processing apparatus based on the group information;

storing the image files in a storing region of the image processing apparatus according to the changed file names; and displaying the image files in a condition classified according to the changed file names, wherein the group information includes a group number and an intragroup serial number, and the directory is determined based on the group number and the intragroup serial number.

4. A storage medium having stored thereon a program executable by a computer to perform the method according to claim 3.

* * * * *